July 25, 1939.　　　J. C. DRADER ET AL　　　2,167,146
MEANS FOR FINISHING GEARS
Filed April 2, 1936　　　2 Sheets-Sheet 2
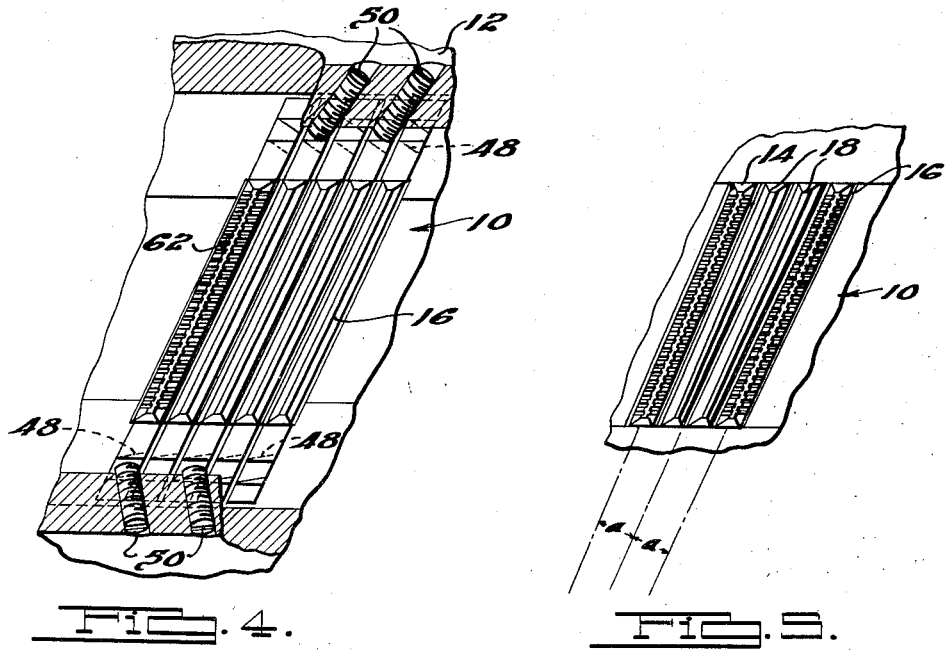
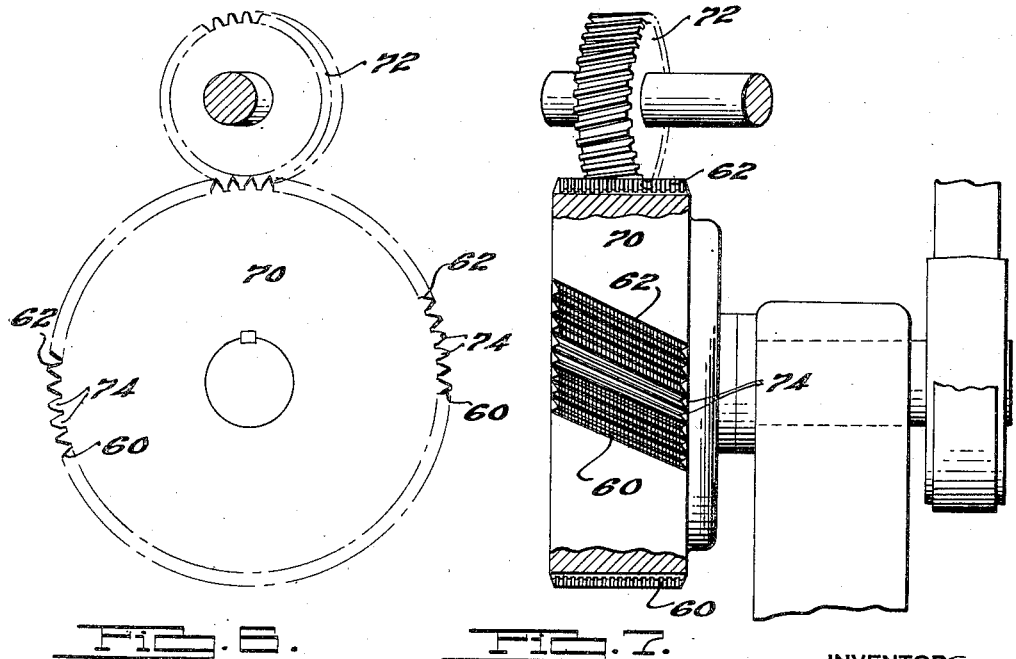
INVENTORS.
Joseph C. Drader,
John D. Rovich.
BY
Harness, Dickey, Pierce & Hann.
ATTORNEYS.

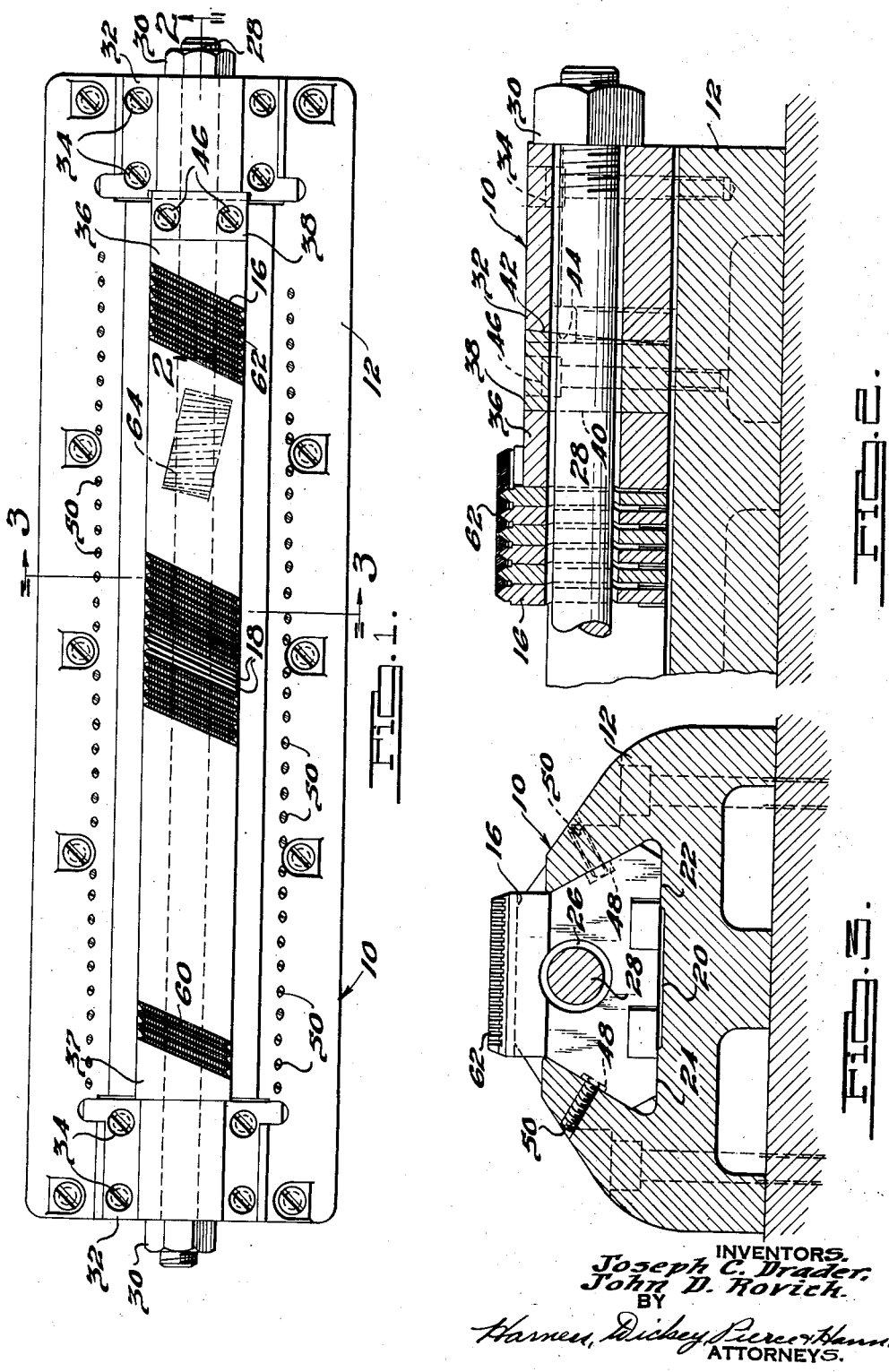

Patented July 25, 1939

2,167,146

UNITED STATES PATENT OFFICE 2,167,146

MEANS FOR FINISHING GEARS

Joseph C. Drader and John D. Rovick, Detroit, Mich., assignors to Michigan Tool Company, Detroit, Mich., a corporation of Delaware Application April 2, 1936, Serial No. 72,270

14 Claims. (Cl. 29—96)

The present invention relates to the finishing of gears, and in particular provides an improved tool for crowning the teeth of gears.

As will be understood, a crowned gear tooth may be characterized as one which is thicker at the mid plane of the gear than at the ends or, stated in another way, is one in which each tooth face can be considered for purposes of description as formed of two portions which meet at or near the mid plane of the gear and each of which is progressively relieved or cut back as the ends of the tooth are approached. Each tooth face portion may thus be said to be facially relieved from a point at or near the mid plane of the gears to the end of the associated tooth, and a principal object of the present invention is to provide an improved tool for providing the facial relief on the tooth face portions.

Further objects of the present invention are to provide a method and tool of the character just stated, which may be utilized to crown teeth of gears of either the spur or helical type; to provide such a tool in the practice of which the tool teeth are not required to be complementarily deformed to correspond to the crowning of the gear teeth; to provide such a tool in the use of which both portions of each tooth face of the gear may be progressively relieved in a single pass, or a plurality of duplicate passes of the gear across the tool; and to provide such a tool which may be of either the rack or the circular type.

Further objects of the present invention are to provide an improved tool for crowning gear teeth in the manner generally stated above, embodying two groups of teeth, the teeth of one group being disposed to relieve one portion of each tooth face and the teeth of the other group being disposed to relieve the other portion of each tooth face; to provide such a tool in which the two groups of teeth are disposed in successive relation; to provide a tool as just stated in which the teeth of both groups may be of duplicate construction; to provide a tool as just stated in which the teeth of the two groups are disposed at an angle to each other corresponding to and determined by the degree of crowning desired; and to provide a tool as just stated embodying one or more bridging teeth to accommodate the passage of the gear from the teeth of one group to the teeth of the other group.

Further objects of the present invention are to provide an improved rack structure, embodying a plurality of plates, one edge of each of which is formed as a rack tooth, and comprising improved means to retain the plates in rack formation; to provide a rack construction as just stated, embodying improved wedging means to prevent displacement of the several plates relative to each other; and to provide a rack embodying a plurality of locking screws, associated with the respective plates, and each adapted to act in a direction at an angle to the face of the associated plate, to thereby urge such plate into engagement with an adjacent plate and into firm relation to the supporting structure.

With the above and other objects in view, which appear in the following description, preferred but illustrative embodiments of the present invention are shown in the accompanying drawings, throughout the several views of which corresponding reference characters are used to designate corresponding parts and in which:

Figure 1 is a top plan view of a rack embodying the present invention;

Figure 2 is a fragmentary view in vertical section, taken along the line 2—2 of Figure 1;

Figure 3 is a view in vertical section, taken along the line 3—3 of Figure 1;

Figure 4 is a fragmentary view in top plan, with parts broken away, showing the improved wedging means associated with the rack plates;

Figure 5 is a fragmentary view enlarged to show in detail the bridging plates between the two groups of rack teeth;

Figure 6 is a diagrammatic view illustrating the embodiment of the present invention in tools of the circular type; and Figure 7 is a view corresponding to Figure 6, and illustrating the details of the bridging teeth between the two groups of cutting teeth.

Referring in detail to Figures 1, 2 and 3, the rack 10 comprises generally a base 12 to which are secured, in longitudinally extending relation, a group of cutting plates 14, a second group of plates 16 and a group of bridging plates 18. The tooth forms of the respective groups of plates are described in more detail hereinafter.

All of the plates 14, 16 and 18 are of similar dovetail formation and are received, in abutting relation, in a correspondingly dovetailed and accurately formed recess in the base 12, the base of the latter recess being further cut away at 20 to form spaced lands 22 and 24, which directly engage and support the bases of the plates. Each plate is provided with a central opening 26, through which a bolt 28 passes, the nuts 30 associated with which bear against abutments 32 which are removably secured to the ends of the supporting base 12 by studs 34.

As will be appreciated, the plates may be disposed within the rack either perpendicular to the axis of the rack or at a different angle to such axis, depending upon the intended use thereof. In the former instance, filler blocks 36 and 37 are disposed between the endmost plates and the supporting structure. A wedge block 38, having a vertical face 40 to cooperate with the corresponding face of the associated filler block 36, and a tapered rear face 42, to cooperate with the correspondingly but oppositely tapered inner face 44 of the associated abutment 32, is removably secured to the base 12 by the countersunk studs 46.

Each of the plates is provided with notches 48 which cooperate with set screws 50 which are threaded through the side walls of the base 12, in a direction to engage in the associated notches 48 at an angle to the associated plate. As best seen in Figure 4, alternate plates are engaged by set screws 50 which are disposed at one side of the base, and the intervening plates are engaged by set screws 50 which pass through the opposite side of the base 12.

In assembling the rack, the plates 14, 16 and 18 are slid into the dovetail recess in the base 12 and moved therealong until the left hand plate, as viewed in Figure 1, abuts against the associated filler block 37, which is fixed in position axially of the rack by its abutting relation to the abutment 32. Thereafter the remaining filler block 36, the wedge block 38, and the remaining abutments 32 may be moved into place, and the bolt 30 passed axially through the rack. The final assembly steps comprise the tightening down of the wedge block 38 by the studs 46, which, as will be evident, acts longitudinally of the rack to force the plates into solid abutting relation; and the tightening down of the set screws 50, as will be evident, acts to directly force the associated plates downwardly and laterally of the rack into solid abutting relation to one side and to the base of the dovetail recess in the member 12. It will be noted also that the set screws 50 act in a direction to force the associated plates longitudinally of the rack into solid abutting relation to the adjacent plates, and thus supplement the wedging action of block 38. It will be evident that the construction described provides a rigid assembly, embodying a limited number of parts, which may be readily and economically manufactured and assembled.

In accordance with the disclosure of the copending application of William F. Dalzen, Serial No. 554,193, filed July 31, 1931, the plates 14, 16 are each provided with rack teeth 60, each tooth face of which is formed of a plurality of spaced lands and grooves, the lateral edges of the lands being formed as cutting edges. Accordingly, when a gear 62 of helix angle different than the angle of the rack teeth, and with its axis disposed at an angle to the axis of the rack determined by such difference, is rolled along the rack, a lateral component of motion occurs between the rack and gear teeth, which lateral component of motion effects the entire machining or shaving action. Thus, a rack having teeth at 90 degrees to the rack axis may be used to finish a gear having a 45 degree helix by disposing the gear axis at an angle of 45 degrees to the rack axis; or, a spur gear may be finished on a rack having a 30 degree spiral angle by disposing the rack and gear axes at 30 degrees to each other.

The rack teeth may thus bear a variety of spiral angle relations to the rack axis, when used with the rack axis at an angle to the gear axis, and the same is true in instances where the principle of crossed axes, discussed above, is not employed. For the purposes of the present description, the just identified angle between the rack plates and the axis of the rack may be called the normal angle.

In accordance with the present invention, the plates 16 are disposed at an angle to the rack axis which slightly exceeds such normal angle and the plates 14 are disposed at an angle which is slightly less than such normal angle. These angles may be identified as the actual angles of the rack plates. In a preferred embodiment, the actual angle of the teeth of plates 16 exceeds the normal angle by the degree of relief which it is desired to apply to one of the previously identified tooth face portions of the gear to be finished, and the actual angle of the teeth of plates 14 is similarly determined.

In further accordance with the illustrated embodiment of the present invention, the previously mentioned bridging teeth 18 which separate the two groups of cutting teeth 16 and 14, are plain, that is, are not provided with cutting edges, and each of the teeth 18 is of tapered formation, the taper of each thereof being equal to half the difference in angle between plates 16 and plates 14.

In operation, the gear 62 to be operated upon is rolled upon the rack with its axis at an angle to the axis of the rack determined by the previously identified normal angle. A slight angle thus exists between the tooth faces of the gear 62 and the cutting edges of the teeth of the plate being engaged thereby. As gear 62 is rolled along the rack, accordingly, the cutting action effected by the lateral component of movement between the rack teeth and the gear teeth is such as to facially relieve one face portion of each gear tooth face. It will be understood that sufficient of the plates of each group are provided to permit a complete revolution of the gear being operated upon while passing over each group. Accordingly, in passing over the teeth of the plates 16, one face portion of each of the gear teeth is relieved. No cutting action occurs as the gear 62 passes over the bridging teeth 18, which serve merely to take up the angle between the plates 16 and 14, but as the gear 62, maintaining the same crossed axes relation to the rack as during the initial part of the cutting, rolls along the teeth of the plates 14, a facial relief is given the opposite portion of each gear tooth face, since the cutting edges of the plates 14 are in opposite angular relation to the previously identified normal angle.

During successive passes of gear 62 over the rack, the gear may be radially fed into the rack, and in each such pass, the cutting edges of the plates 16 act to facially relieve one face portion of each gear tooth and the cutting edges of the plates 14 act to correspondingly relieve the opposite face portion of the gear tooth face. The resulting gear teeth are, therefore, of crowned formation, being thicker adjacent the midplane than at the edges by an amount determined by the angular relation of the teeth of plates 14 to those of plates 16.

Referring to Figures 6 and 7, the invention is embodied in a tool 70 of the circular type adapted to provide crowned teeth on the illustrative gear 72. In this instance also, the teeth of tool 70 are arranged in two groups, the teeth of one group being designated as 62 and those of the other tooth being designated as 60. In this instance, however, two groups of bridging teeth 18 are provided. As in the case of the rack, the teeth 62 are formed at a different helix angle than the teeth 60, the angle of the teeth 62 exceeding what may be called the normal helix angle of the tool by an amount determined by the degree of crowning desired, and the helix angle of the teeth 60 being correspondingly less than the normal helix angle of the tool. Accordingly, as gear 72 is rolled relative to tool 70

70, the teeth 62 progressively cut a facial relief on one portion of each tooth face of gear 72 and the teeth 60 progressively apply an opposite facial relief to the other face portions of each gear tooth face.

Although specific embodiments of the present invention have been described, it will be evident that various changes in the form, number and arrangement of parts of structures for practising the same, and that various modifications in the specific method disclosed, may be made within the spirit and scope thereof.

What is claimed is:

1. A tool for facially relieving the teeth of gears comprising, in combination, a plurality of groups of cutting teeth disposed in succession along and transversely of the working surface of said tool, each of said groups comprising a plurality of similarly formed teeth; the teeth of each group being disposed at the same transverse angle to the surface of the tool, the teeth of the different groups being disposed at different transverse angles to the surface of the tool, and bridging teeth disposed between said successive groups of teeth.

2. A gear rack comprising, in combination, a supporting base having a longitudinally extending recess, a plurality of rack plates disposed to be received in said recess; abutment means disposed adjacent one end of said base; and a plurality of wedging elements disposed along the body of said base and disposed to act upon certain of said plates to urge the same longitudinally of said recess in the direction of said abutment.

3. A gear rack comprising, in combination, a base structure having a longitudinally extending recess formed therein; a plurality of plates disposed to be received in said recess; abutment means adjacent the respective ends of said base; wedge means disposed to act between said plates and one of said abutments to urge said plates in the direction of the other of said abutments; and supplemental wedging means disposed along the body of said face and adapted to act upon certain of said plates to urge the same in the direction of said other abutment.

4. A gear rack comprising, in combination, a supporting base having a longitudinally extending recess; a plurality of plates disposed to be received in said recess; abutment means disposed adjacent one end of said base; and wedging means comprising a plurality of elements passed through said base structure at a slanting angle to the axis thereof such that said elements act directly upon certain of said plates to urge the same in the direction of said abutment.

5. A gear rack comprising, in combination, a supporting base having a longitudinally extending recess; a plurality of plates disposed to be received in said recess; abutment means disposed adjacent one end of said base; and a plurality of set screws distributed along said body and passed therethrough at a slanting angle to the axis thereof such that said set screws act upon certain of said plates to urge the same in the direction of said abutment.

6. A gear rack comprising, in combination, a supporting base, a plurality of plates each having cutting edges carried by and disposed at a transverse angle to said base; and means securing said plates to said base with certain of said plates disposed at a transverse angle which is different than the transverse angle of others of said plates, including a bridging plate of tapered construction disposed between said certain of said plates and said others of said plates.

7. A gear-like cutting tool comprising, in combination, a plurality of cutting teeth arranged in successive groups, the teeth in certain of said groups being disposed at a helix angle to the teeth of others of said groups, and bridging teeth of tapered form disposed between said successive groups of teeth.

8. A tool for facially relieving the teeth of gears comprising a plurality of groups of teeth, all of the teeth being disposed in a single row in succession along the tool body in gearlike relation so that a gear can have rolling contact thereacross and each tooth extending transversely of the cutting surface of said tool, the teeth of one of said plurality of groups being disposed at a transverse angle different than the transverse angle of the teeth of another of said groups.

9. A tool for facially relieving the teeth of gears comprising, in combination, a plurality of groups of teeth, all of the teeth being disposed in a single row in succession along the tool body in gearlike relation so that a gear can have rolling contact thereacross and each tooth extending transversely of the working surface of said tool, each of said groups comprising a plurality of similarly formed teeth; the teeth of each group being disposed at the same transverse angle to the surface of the tool, the teeth of the different groups being disposed at different transverse angles to the surface of the tool.

10. A gear rack comprising, in combination, a supporting base, a plurality of plates having rack teeth formed thereon which are disposed in a single row so that a gear can have rolling contact therealong and with each tooth extending transversely of the rack body, the cutting edges of certain of said teeth being disposed at a transverse angle which is different than the transverse angle of the cutting edges of others of said teeth.

11. A gear rack comprising, in combination, a supporting base, a plurality of plates each having working edges carried by said base; and means securing said plates to said base in a single row so that a gear can have rolling contact therealong and with each tooth extending transversely of the tool body, and with the said edges of certain of said plates disposed at a finite spiral angle to the said edges of others of said plates.

12. A gear-like cutting tool comprising a single tool body having a plurality of teeth disposed in a single row with each tooth extending transversely across the tool body, certain of said cutting teeth being disposed at a finite helix angle to others of said cutting teeth.

13. A gear-like cutting tool comprising, in combination, a single tool body having a plurality of teeth arranged in a single row in successive groups thereon with each tooth extending transversely across the tool body, the teeth in certain of said groups being disposed at a finite helix angle to the teeth of others of said groups.

14. A tool for facially relieving the teeth of a gear comprising, in combination, a single tool body having a plurality of teeth disposed in a single row, each tooth extending transversely across the tool body, and the several teeth being disposed so the said gear can have continuous rolling contact across the teeth, the transverse angle of certain of the teeth being different than the transverse angle of others of the teeth.

JOHN D. ROVICK.
JOSEPH C. DRADER.